Dec. 30, 1924.   1,521,517
R. W. FAIRBANK
HAND ACCELERATOR
Filed May 10, 1924
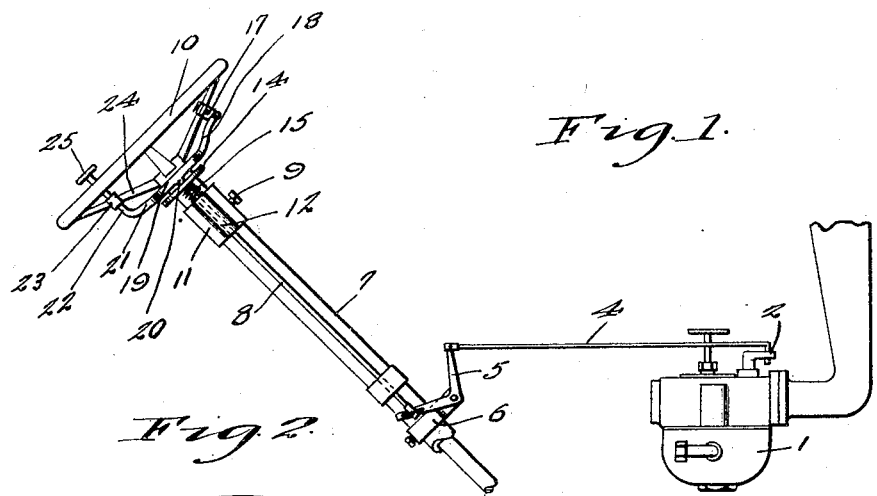
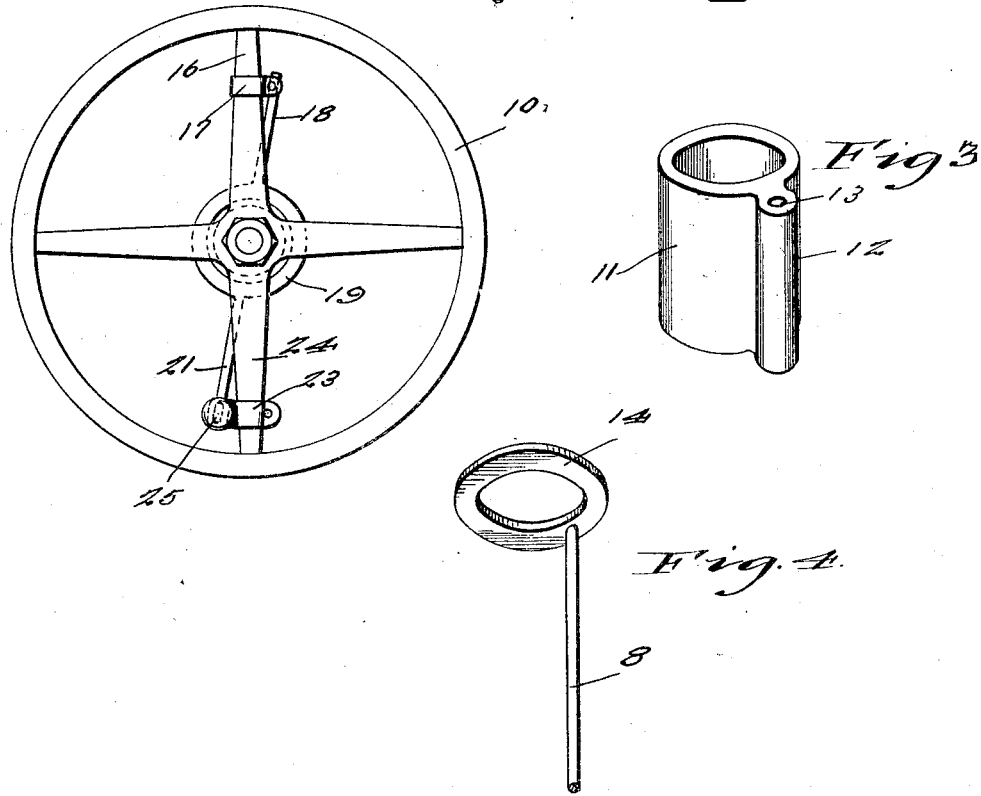
R. W. Fairbank  INVENTOR Patented Dec. 30, 1924.

1,521,517

UNITED STATES PATENT OFFICE.

RALPH W. FAIRBANK, OF TOLEDO, OHIO.

HAND ACCELERATOR.

Application filed May 10, 1924. Serial No. 712,408.

*To all whom it may concern:*

Be it known that I, RALPH W. FAIRBANK, a citizen of the United States, residing at Toledo, in the county of Lucas and State of Ohio, have invented new and useful Improvements in Hand Accelerators, of which the following is a specification.

The object is the provision of means on the steering wheel of an automobile for operating the throttle valve of the engine carbureter to overcome the necessity of the driver feeling for the accelerator pedal with his foot in congested districts where frequent stopping, starting and shifting of gears is required, and also whereby the driver is allowed to keep his foot on the brake pedal when in such congested travel.

To the attainment of the foregoing the invention consists in the improvement as hereinafter described and definitely claimed.

In the drawing:—

Figure 1 is a view of a sufficient portion of the steering post column and wheel as well as the carbureter of an automobile engine to illustrate the improvement.

Figure 2 is a top plan view looking toward the steering post.

Figure 3 is a perspective view of the sleeve employed.

Figure 4 is a perspective view of the slidable rod having the ring head.

In the drawing, the numeral 1 designates the carbureter for an internal combustion engine and 2 the lever for the throttle valve. Connected to the angle outer end of the lever there is a rod 4. The rod is pivotally secured to one of the arms of a bell crank lever 5 pivotally supported on the straight end of a sleeve 6 adjustably secured on the steering post column 7 of the automobile. The second arm of the bell crank lever is provided with an elongated slot and receives therethrough a pivot on the bifurcated end of a rod 8.

Secured by a binding element 9 on the steering post column 7 below the steering wheel 10 there is a sleeve 11. This sleeve is provided on one of its sides with an enlargement 12 formed with a central opening 13 through which the rod 8 passes. The rod 8 has its outer end formed with or secured to a ring or washer 14 arranged around the steering post column 7. On the rod and contacting between the disk head 14 and the sleeve 11 there is a helical spring 15 which normally holds the rod in one position. On one of the spokes 16 of the steering wheel 10 there is secured a bracket 17 to which is pivoted an angle arm 18. The arm 18 is formed with a ring member 19 that surrounds the steering post column. The ring member has its under face provided with lugs 20 that rest on the disk head 17 of the rod 8. The ring member 19 has a second angle arm 21 terminating in an upstanding end 22 received through a suitable guide opening in a bracket 23 that is secured to the spoke 24 of the steering wheel that is in a line with the spokes 16. The element 22 has its outer end provided with a head 25. The ring member and its arms constitute a lever. A depression on the head 25 of this lever will cause the head 14 of the arm 8 to move the latter downwardly, swinging the bell crank lever to exert a pull on the rod 4 and open the throttle valve.

Having described the invention, I claim:—

1. In combination with the steering post column, the steering wheel and the carbureter for the engine of an automobile, of a hand accelerator for the automobile, including a rod connected to the angle arm of the throttle lever of the carbureter, a bell crank lever pivotally supported on the steering post and having one arm connected with the rod and its second arm slotted, a rod pivotally associated with the slotted end of the bell crank lever, guide means on the steering post for the rod, a disk head on the rod surrounding the steering post, spring means surrounding the rod and exerting a tension between the disk head and one of the bearings for the rod, a lever having one end pivotally supported on one of the arms of the steering wheel and its second end offset and guided through another arm of the steering wheel and formed with a head designed for pressure by the hand of the driver to swing the lever to contact the head of the rod to move the same and open the throttle valve.

2. In combination with the steering post column, the steering wheel and the carbureter for the engine of an automobile, of a hand accelerator for the automobile, including a rod connected to the angle arm of the throttle lever of the carbureter, a bell crank lever pivotally supported in the steering post and having one arm connected with the rod and its second arm slotted, a rod pivotally associated with the slotted end of the bell crank lever, guide means on the steering post for the rod, a disk head on the rod surrounding the steering post, spring means surrounding the rod and exerting a tension between the disk head and one of the bearings for the rod, a lever, said lever comprising a ring body which surrounds the steering post column and has lugs thereon in contact with the disk head of the rod, an angle arm extending from the lever and pivotally secured to one of the spokes of the steering wheel, a second and oppositely directed arm on the body having an offset end, guide means on another spoke of the steering wheel through which the said end of the lever is received, as and for the purpose set forth.

In testimony whereof I affix my signature.

RALPH W. FAIRBANK.